(12) United States Patent
Kurose et al.

(10) Patent No.: US 12,728,685 B2
(45) Date of Patent: Sep. 8, 2026

(54) VEHICLE

(71) Applicant: HONDA MOTOR CO., LTD., Tokyo (JP)

(72) Inventors: Yuichiro Kurose, Tokyo (JP); Shimpei Shikanai, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/126,265

(22) PCT Filed: Nov. 29, 2023

(86) PCT No.: PCT/JP2023/042746
§ 371 (c)(1),
(2) Date: May 1, 2025

(87) PCT Pub. No.: WO2024/117185
PCT Pub. Date: Jun. 6, 2024

(65) Prior Publication Data

US 2026/0166940 A1 Jun. 18, 2026

(30) Foreign Application Priority Data

Nov. 30, 2022 (JP) ................................ 2022-191429

(51) Int. Cl.
*B60G 17/017* (2006.01)
*B62H 1/02* (2006.01)
*B62K 23/02* (2006.01)

(52) U.S. Cl.
CPC ............. *B60G 17/017* (2013.01); *B62H 1/02* (2013.01); *B62K 23/02* (2013.01); *B60G 2300/12* (2013.01); *B60G 2400/96* (2013.01)

(58) Field of Classification Search
CPC .............. B60G 17/017; B60G 2300/12; B60G 2400/0511; B62H 1/02; B62K 23/02; B62K 2025/044; B62K 5/10
(Continued)

(56) References Cited

U.S. PATENT DOCUMENTS 9,623,925 B2 * 4/2017 Sturdevant ............... B62H 1/06
2008/0197597 A1 8/2008 Moulene et al.
2023/0303202 A1 * 9/2023 Yamada ................... B62H 1/04
2023/0382174 A1 * 11/2023 Coleman ............. B62D 53/062

FOREIGN PATENT DOCUMENTS

DE 102004049568 B4 * 10/2008 ............... B62H 1/02
JP 01-257685 10/1989
(Continued)

OTHER PUBLICATIONS

Computer generated English translation of DE 10 2004049568 (Year: 2004).*
(Continued)

*Primary Examiner* — Jason D Shanske
*Assistant Examiner* — Tiffany L Webb
(74) *Attorney, Agent, or Firm* — Amin, Turocy & Watson, LLP

(57) ABSTRACT

This vehicle includes: at least one front wheel and at least one rear wheel that are arranged at a front position and a rear position of a vehicle body, respectively; a suspension device that is arranged between a vehicle body configuration component and at least one of the front wheel and the rear wheel and has a vehicle height adjustment function; a control device that controls driving of an actuator which extends and contracts the suspension device; and a vehicle body angle detection device that detects an inclination angle of the vehicle body. When parking of the vehicle is detected, the control device measures the inclination angle of the vehicle body by the vehicle body angle detection device and extends
(Continued)

or contracts the suspension device by driving the actuator so as to cause the inclination angle to be closer to a prescribed target angle.

6 Claims, 9 Drawing Sheets

(58) Field of Classification Search
USPC .......................................................... 701/37
See application file for complete search history.

(56) References Cited

FOREIGN PATENT DOCUMENTS

| | | |
|---|---|---|
| JP | 2004-224311 | 8/2004 |
| JP | 2007-314004 | 12/2007 |
| JP | 2008-505797 | 2/2008 |
| JP | 2018-121395 | 8/2018 |
| JP | 2021-049812 | 4/2021 |
| KR | 10-2010-0134988 | 12/2010 |
| WO | 2019/059333 | 3/2019 |
| WO | 2022/018144 | 1/2022 |

OTHER PUBLICATIONS

Computer generated English translation of JP 2007-314004 (Year: 2007).*

International Preliminary Report on Patentability for International Application No. PCT/JP2023/042746 mailed on Aug. 13, 2024.

International Search Report and Written Opinion for International Application No. PCT/JP2023/042746 mailed on Feb. 13, 2024, 9 pages.

* cited by examiner

VEHICLE

TECHNICAL FIELD

The present invention relates to a vehicle.

Priority is claimed on Japanese Patent Application No. 2022-191429, filed on Nov. 30, 2022, the contents of which are incorporated herein by reference.

BACKGROUND

In the related art, a vehicle has been known in which a damping force and a preload of a suspension device are variable by an electronic control, and thereby, a comfortable ride quality and a good travel performance can be easily obtained (for example, refer to Patent Document 1).

RELATED ART DOCUMENTS

Patent Documents

[Patent Document 1]

Japanese Unexamined Patent Application, First Publication No. 2021-49812

SUMMARY OF INVENTION

Problems to be Solved by the Invention

Since the vehicle cost increases when an electronically controlled suspension is employed, particularly in a small vehicle such as a motorcycle, creation of a further added value is desired.

Therefore, the present invention aims at improving an added value in a vehicle including an electronically controlled suspension by using the suspension and stabilizing a vehicle state at the time of parking.

Means for Solving the Problem

As a means for solving the problem described above, a first aspect of the present invention is a vehicle including: at least one front wheel (2) and at least one rear wheel (12) that are arranged at a front position and a rear position of a vehicle body (1A), respectively; a suspension device (3A, 13A) that is arranged between a vehicle body configuration component and at least one of the front wheel (2) and the rear wheel (12) and has a vehicle height adjustment function; a control device (23) that controls driving of an actuator (43*f*, 43*r*) which extends and contracts the suspension device (3A, 13A); a vehicle body angle detection device (34) that detects an inclination angle (θ1) of the vehicle body (1A); and a side stand (17) capable of supporting the vehicle body (1A) in a standing state in which the vehicle body (1A) is inclined to one of right and left sides, wherein the vehicle includes: a parking operation detection portion (37) which detects that a use operation of the side stand (17) is performed at a time of parking of the vehicle, and the control device (23) detects parking of the vehicle when the parking operation detection portion (37) detects the use operation, and when the parking of the vehicle is detected, the control device (23) measures the inclination angle (θ1) of the vehicle body (1A) by the vehicle body angle detection device (34) and extends or contracts the suspension device (3A, 13A) by driving the actuator (43*f*, 43*r*) so as to cause the inclination angle (θ1) to be closer to a prescribed target angle (θ2).

According to this configuration, when the control device detects parking (for example, the vehicle stops, and a prescribed parking operation is performed) of the vehicle, the control device measures an actual inclination angle of the vehicle body by the vehicle body angle detection device. The control device extends or contracts the suspension device (changes the vehicle height) so as to cause the inclination angle to be closer to the target angle. Thereby, for example, even when the inclination angle of the vehicle body increases or decreases due to the inclination of the ground, the loading of a heavy object, or the like, the inclination angle of the vehicle body can be properly maintained by extending or contracting the suspension device, and the vehicle can be stabilized at the time of parking.

Further, when the parking operation detection portion detects that the parking operation is performed by the user, the control device detects parking of the vehicle. Thereby, it possible to further reliably detect parking of the vehicle, and it is possible to prevent malfunction of the suspension device.

A second aspect of the present invention is the vehicle according to the first aspect described above, wherein the control device (23) contracts the suspension device (3A, 13A) when the inclination angle (θ1) is larger than the target angle (θ2), and the control device (23) extends the suspension device (3A, 13A) when the inclination angle (θ1) is smaller than the target angle (θ2).

According to this configuration, in the suspension device of a type that is contracted when receiving a load from the ground, the control device extends or contracts the suspension device and properly maintains the inclination angle of the vehicle body. Therefore, the vehicle can be stabilized at the time of parking.

A fourth aspect of the present invention is the vehicle according to the first or second aspect described above, wherein the parking operation detected by the parking operation detection portion (36, 37, 38) includes an operation of restricting a movement of the vehicle.

According to this configuration, when the operation of restricting the movement of the vehicle is performed by the user, the control device extends or contracts the suspension device. Thereby, it possible to enhance the stability when the inclination angle of the vehicle body is changed. When the use of the parking brake is a condition for the parking detection, the operation itself necessary for the parking is one of the conditions for the parking angle adjustment control. Thereby, the parking operation necessary for the control can be easily understood, and it is possible to enhance convenience.

A fifth aspect of the present invention is the vehicle according to the first or second aspect described above, wherein the control device (23) detects the parking of the vehicle when detecting that the vehicle does not move for a prescribed time after a main switch (36) of the vehicle is turned off.

According to this configuration, the control device determines that the vehicle is parked when the main switch of the vehicle is turned off and when it is detected that the vehicle does not move for the predetermined time. Thereby, a parking operation other than an operation of turning off the main switch becomes unnecessary, and a simple configuration can be obtained.

A sixth aspect of the present invention is the vehicle according to the first aspect described above, wherein at least one of the front wheel (2) and the rear wheel (12) includes a pair of right and left wheels (W1, W2), the suspension device (3A, 13A) includes a pair of right and left cushion units (CS1, CS2) that are arranged between each of the pair of right and left wheels (W1, W2) and the vehicle body configuration component, the pair of right and left wheels (W1, W2) are capable of moving upward and downward independently by extension or contraction of the pair of right and left cushion units (CS1, CS2), and the control device (23) performs an operation of extending one of the pair of right and left cushion units (CS1, CS2) or an operation of contracting another of the pair of right and left cushion units (CS1, CS2) or performs both of the extending operation and the contracting operation so as to cause the inclination angle (θ1) to be closer to the target angle (θ2).

According to this configuration, the vehicle body angle detection device measures the inclination angle in a rightward-leftward direction of the vehicle body, and the control device extends or contracts the pair of right and left cushion units and independently moves the pair of right and left wheels upward and downward. Thereby, the inclination angle in the rightward-leftward direction of the vehicle body can be properly maintained, and the vehicle can be stabilized at the time of parking.

A seventh aspect of the present invention is the vehicle according to the first aspect described above including: a parking control button (39) supported by a handle (4*a*), wherein a control that causes the inclination angle (θ1) to be closer to the prescribed target angle (θ2) is performed when the parking control button (39) is being pressed.

An eighth aspect of the present invention is the vehicle according to the first aspect described above including: a seating sensor on a seat (16*a*, 16*b*), wherein a control that causes the inclination angle (θ1) to be closer to the prescribed target angle (θ2) is performed when detecting that a user gets off the vehicle.

Advantage of the Invention

According to the present invention, in a vehicle including an electronically controlled suspension, it is possible to improve an added value by using the suspension and stabilizing the vehicle state at the time of parking.

BRIEF DESCRIPTION OF THE DRAWINGS

FIG. 10 is a left side view showing an example of a parking angle adjustment control of a vehicle including a suspension device on each of front and rear wheels.

DESCRIPTION OF THE EMBODIMENTS

Figure 1:
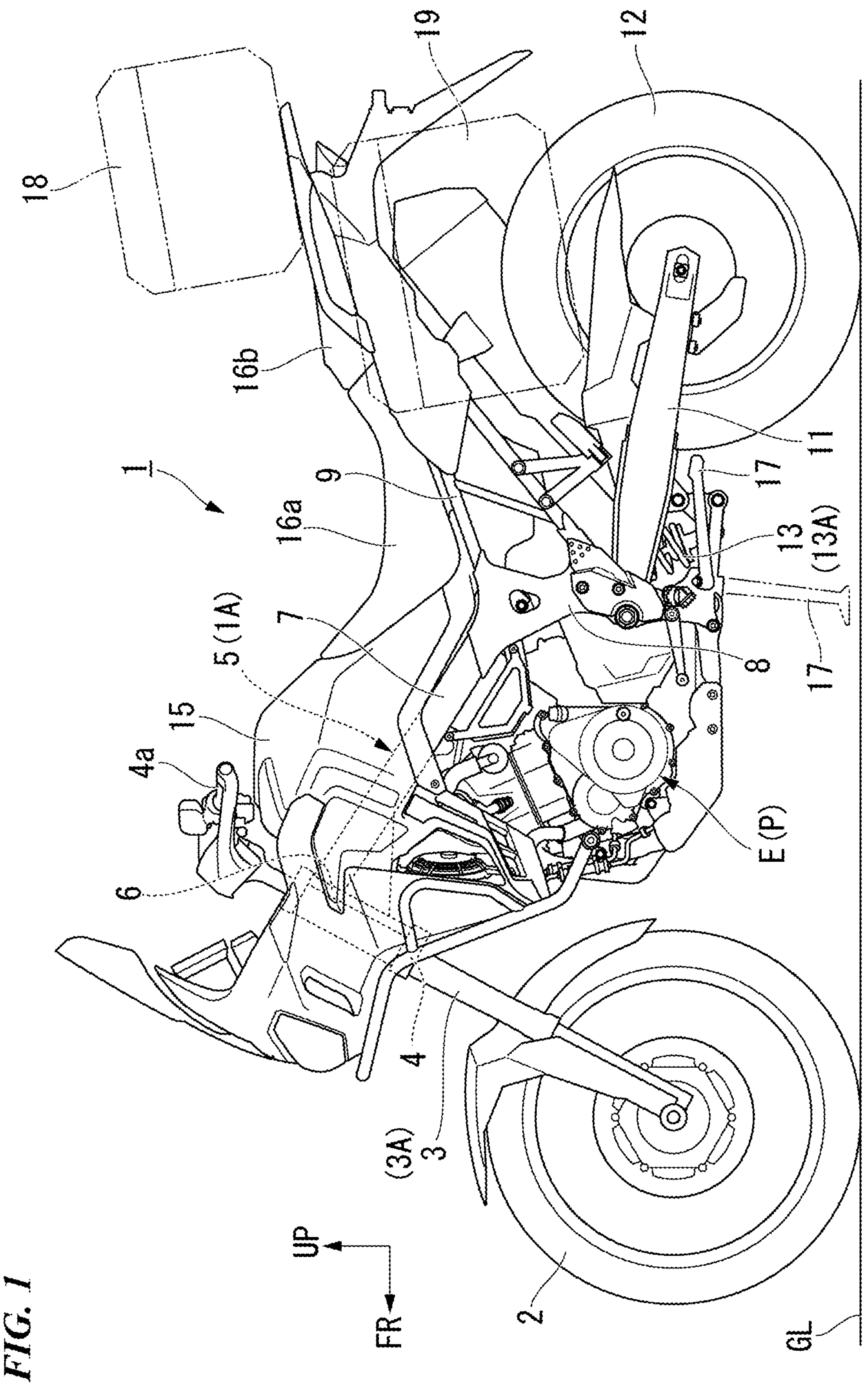
FIG. 1 is a left side view of a motorcycle in an embodiment of the present invention.

Hereinafter, embodiments of the present invention will be described with reference to the drawings. Directions such as forward, rearward, leftward, and rightward directions in the following description are the same as directions in a vehicle described below unless otherwise specified. Further, in appropriate positions in the drawings used in the following description, an arrow FR that indicates a vehicle forward direction, an arrow LH that indicates a vehicle leftward direction, an arrow UP that indicates a vehicle upward direction, and a line CL that indicates a vehicle body rightward-leftward middle are shown.

<Entire Vehicle>

FIG. 1 shows a motorcycle 1 as an example of a vehicle that employs a parking angle control device in an embodiment of the present invention. The motorcycle 1 is an example of a saddle riding vehicle on which an occupant (user) rides while straddling a vehicle body. The motorcycle 1 turns by swinging (banking) the vehicle body in a rightward-leftward direction (roll direction) with a ground contact point of front and rear wheels as the reference. The vehicle of the present invention is not limited to a vehicle that turns by banking the vehicle body and includes a vehicle that turns by the steering of a steering wheel without banking the vehicle body. Further, the vehicle of the present invention includes a vehicle that includes an electric motor as a prime mover.

A front wheel 2 of the motorcycle 1 is supported by a lower end portion of a pair of right and left front forks (telescopic forks) 3. The right and left front forks 3 are supported by a head pipe 6 at a front end portion of a vehicle body frame 5 via a steering stem 4. A bar handle (steering handle) 4*a* for front wheel steering is attached to an upper portion of the steering stem 4. The pair of right and left front forks 3 constitute a front suspension device 3A of the motorcycle 1.

The vehicle body frame 5 includes: a head pipe 6; a pair of right and left main frames 7 that branch to the right and left at the rear of the head pipe 6 and extend obliquely downward and rearward; a pair of right and left pivot frames 8 that extend downward from rear end portions of the right and left main frames 7, respectively; and a rear frame 9 that extends in a rearward direction of the right and left pivot frames 8. A fuel tank 15 is supported above the right and left main frames 7, and front and rear seats 16*a*, 16*b* are supported above the rear frame 9.

A power unit P is supported below the right and left main frames 7 and in front of the right and left pivot frames 8. The power unit P is an integral unit including an engine (for example, an internal combustion engine) E and a transmission. A tiltable side stand 17 capable of supporting a vehicle body 1A in a standing state in which the vehicle body 1A is inclined to a left side is provided on a lower end portion of the left pivot frame 8.

A front end portion of the swing arm 11 is supported by the right and left pivot frames 8. A single rear wheel 12 is supported by a rear end portion of the swing arm 11. A single rear cushion unit 13 is interposed between a front portion of the swing arm 11 and the vehicle body frame 5. The rear cushion unit 13 constitutes a rear suspension device 13A of the motorcycle 1.

Figure 8:
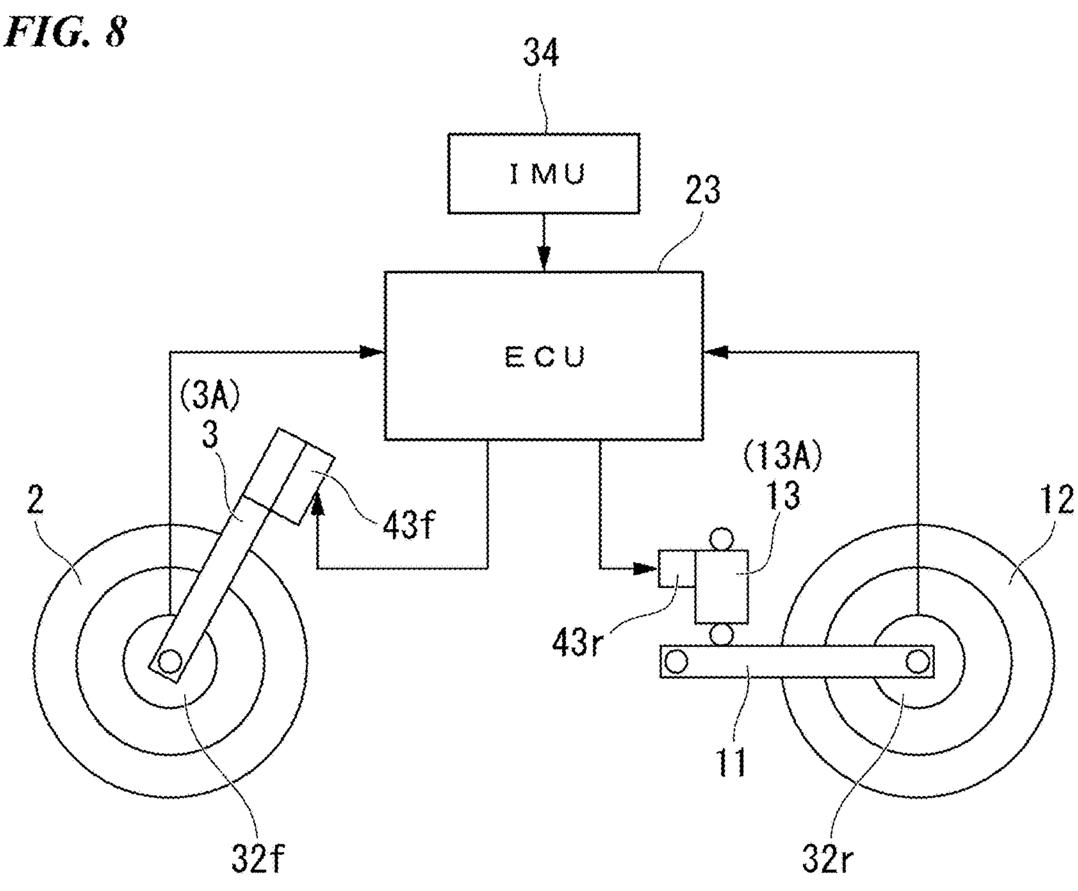
FIG. 8 is a schematic configuration view of a suspension control device of the motorcycle.

With reference also to FIG. 8, in the front suspension device 3A, a cushion spring and a damper are arranged on each of the right and left front forks 3 (or in a distributed manner to the right and left front forks 3). In the front suspension device 3A, a front suspension actuator 43*f* is arranged on at least one of the right and left front forks 3. The front suspension actuator 43*f* displaces a spring seat, for example, by using an electric motor as a drive source and enables adjustment of a preload of the cushion spring. When the preload increases, a sinking amount at the time of applying a load decreases, and the right and left front forks 3 in an empty vehicle state extend. When the preload decreases, the sinking amount at the time of applying the load increases, and the right and left front forks 3 in the empty vehicle state contracts. That is, the front suspension actuator 43*f* extends or contracts (changes) the entire length of the right and left front forks 3 by the preload adjustment and enables a vehicle height adjustment of a vehicle body front part.

In the rear suspension device 13A, a cushion spring, a damper, and a rear suspension actuator 43*r* are arranged on the rear cushion unit 13. The rear suspension actuator 43*r* displaces a spring seat, for example, by using an electric motor as a drive source and enables adjustment of a preload of the cushion spring. When the preload increases, a sinking amount at the time of applying a load decreases, and the rear cushion unit 13 in an empty vehicle state extend. When the preload decreases, the sinking amount at the time of applying the load increases, and the rear cushion unit 13 in the empty vehicle state contracts. That is, the rear suspension actuator 43*r* extends or contracts (changes) the entire length of the rear cushion unit 13 by the preload adjustment and enables a vehicle height adjustment of a vehicle body rear part.

The vehicle height adjustment of the embodiment is not manually performed by the user but is automatically (electrically) performed by a drive control of the front and rear suspension actuators 43*f*, 43*r*.

The front suspension device 3A moves the front wheel 2 upward by an increase of a reaction force from a ground GL (ground contact surface) in accordance with an increase of a front load of the motorcycle 1 and causes the right and left front forks 3 to stroke in a contraction direction.

The front suspension device 3A moves the front wheel 2 downward by a decrease of a reaction force from the ground GL (ground contact surface) in accordance with a decrease of a front load of the motorcycle 1 and causes the right and left front forks 3 to stroke in an extension direction.

The rear suspension device 13A moves the rear wheel 12 upward by an increase of a reaction force from the ground GL in accordance with an increase of a rear load of the motorcycle 1 and causes the rear cushion unit 13 to stroke in a contraction direction.

The rear suspension device 13A moves the rear wheel 12 downward by a decrease of a reaction force from the ground GL in accordance with a decrease of a rear load of the motorcycle 1 and causes the rear cushion unit 13 to stroke in an extension direction.

In the embodiment, the suspension devices 3A, 13A having a layout that contracts by the increase of the load and extends by the decrease of the load are shown as examples; however, the embodiment is not limited to this configuration. That is, a suspension device having a layout that extends by the increase of the load and contracts by the decrease of the load may be employed.

Figure 2:
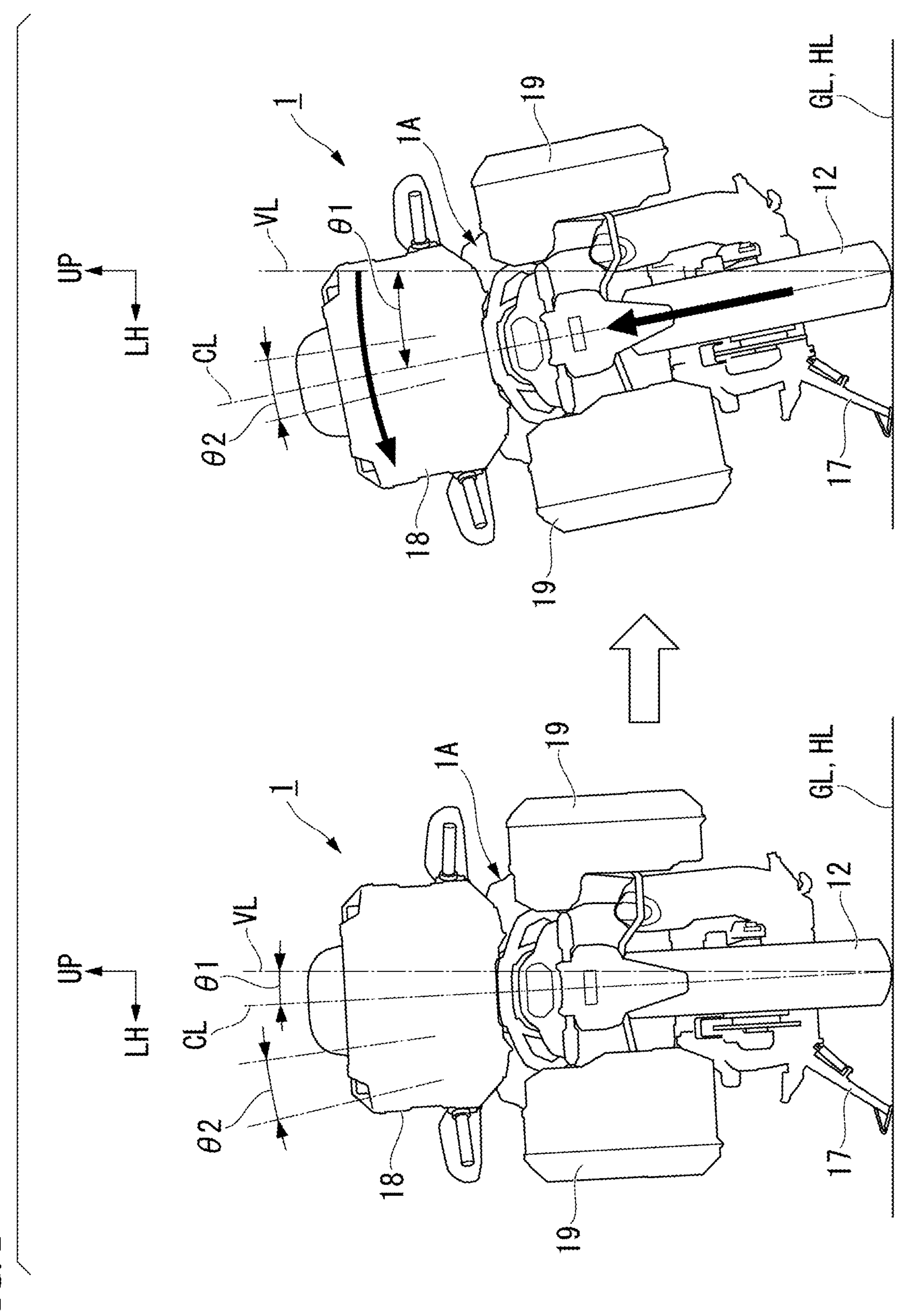
FIG. 2 is a rear view showing a first example of the motorcycle at the time of parking, the left side view shows a state before a parking angle adjustment control, and the right side view shows a state after the parking angle adjustment control.

As shown in FIG. 1 and FIG. 2, a top case 18 can be attached to the motorcycle 1 at the rear of a rear seat 16*b*. A pair of right and left pannier cases 19 can be attached to the motorcycle 1 below right and left sides of the rear seat 16*b*. When these cases are fully loaded, the vehicle body rear part particularly sinks due to a load weight. Therefore, even at the time of stopping in which the side stand 17 is used, an inclination angle (an inclination angle with respect to the vertical direction when seen from a forward-rearward direction) θ1 of the vehicle body 1A may become small and unstable. On the other hand, when the inclination angle θ1 of the vehicle body 1A at the time of stopping in which the side stand 17 is used is set to be large, the inclination angle θ1 of the vehicle body 1A may become large when there is no baggage or the like, and the load around the side stand 17 may become excessive.

When parking (for example, a state where the motorcycle 1 is stopped, and a prescribed parking operation is performed) of the vehicle is detected, the motorcycle 1 of the embodiment measures an actual inclination angle θ1 of the vehicle body 1A. When the inclination angle θ1 is not within a target angle range θ2 (the left side in FIG. 2), a control that extends the front and rear suspension devices 3A, 13A is performed so that the inclination angle θ1 is within the target angle range θ2 (the right side in FIG. 2). In this way, the control that extends or contracts the front and rear suspension devices 3A, 13A so that the inclination angle θ1 of the vehicle body 1A becomes proper is referred to as a parking angle adjustment control. By the parking angle adjustment control, even when the inclination angle θ1 of the vehicle body 1A with respect to the vertical direction increases or decreases by the loading of a heavy object, the inclination of the ground GL, or the like, the inclination angle θ1 of the vehicle body 1A can be properly maintained.

Figure 3:
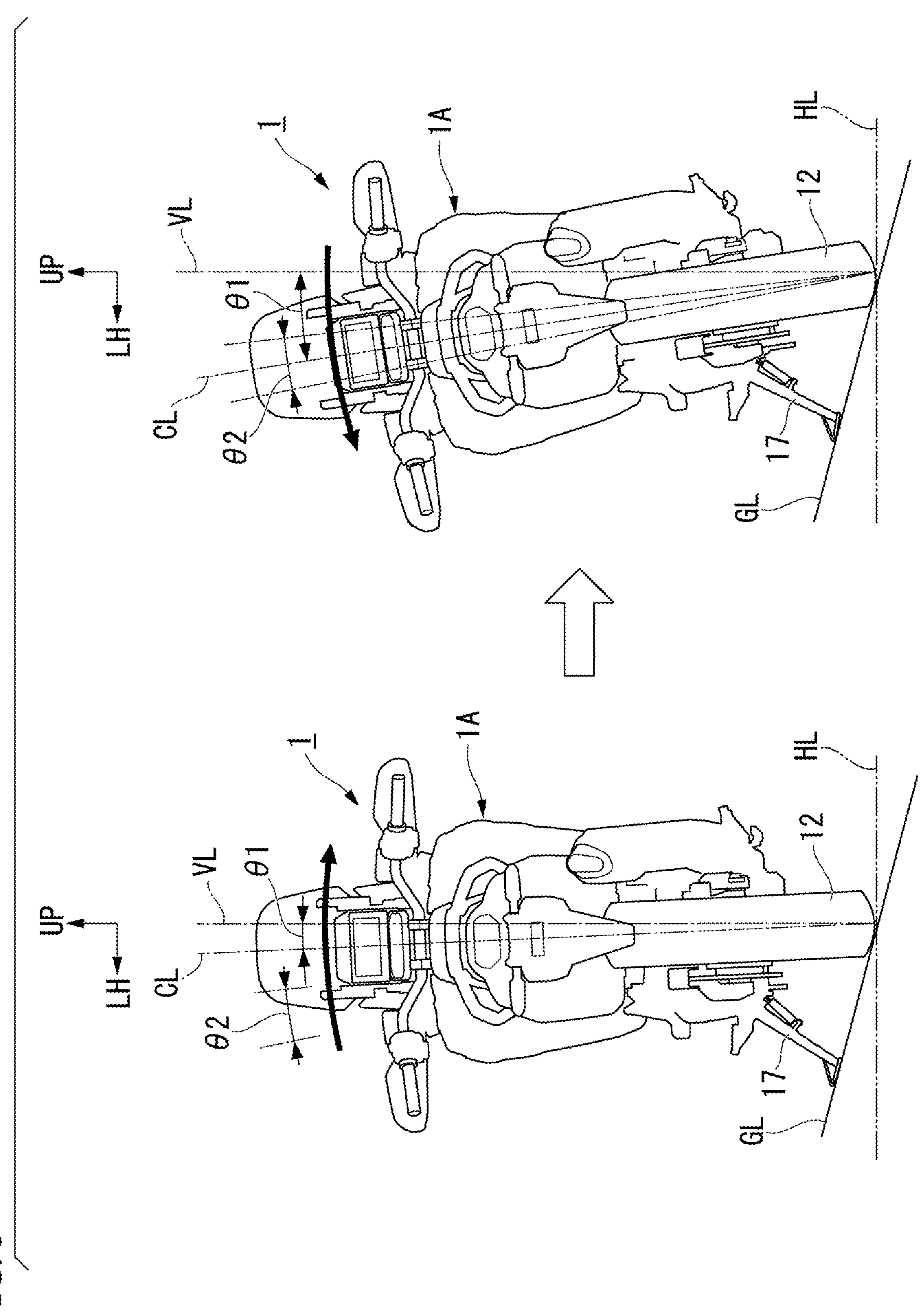
FIG. 3 is a rear view showing a second example of the motorcycle at the time of parking, the left side view shows the motorcycle before the parking angle adjustment control, and the right side view shows the motorcycle after the parking angle adjustment control.

FIG. 3 shows an example in which the motorcycle 1 is parked, for example, on the ground GL inclined so that a position at a further left side (side stand 17 side) is higher. In this example, similarly to FIG. 2, the actual inclination angle θ1 of the vehicle body 1A may be smaller than the target angle range θ2 (the left side in FIG. 3). In this case, a control that extends the front and rear suspension devices 3A, 13A is also performed so that the inclination angle θ1 is within the target angle range θ2 (the right side in FIG. 3).

Figure 4:
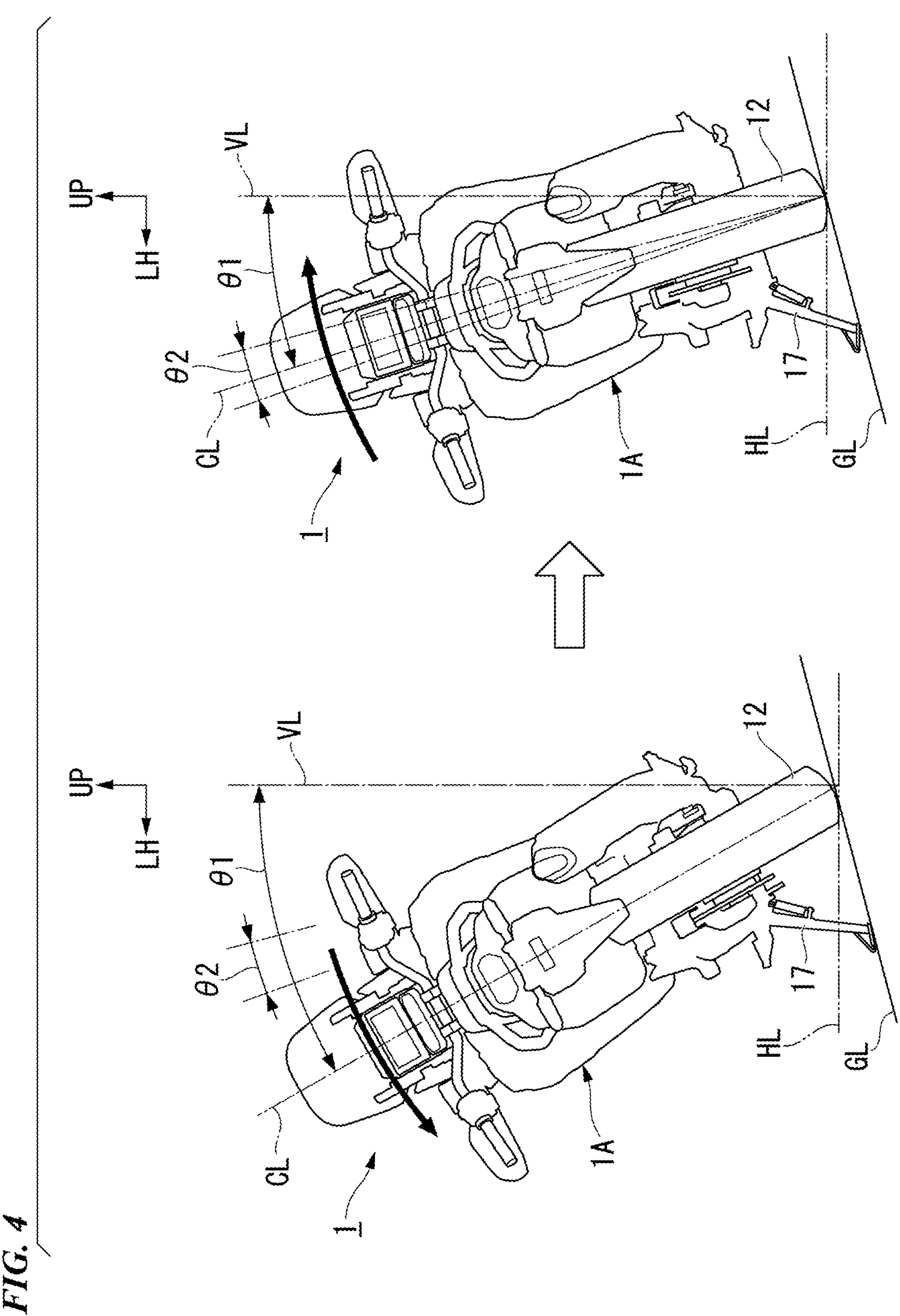
FIG. 4 is a rear view showing a third example of the motorcycle at the time of parking, the left side view shows the motorcycle before the parking angle adjustment control, and the right side view shows the motorcycle after the parking angle adjustment control.

FIG. 4 shows an example in which the motorcycle 1 is parked on the ground GL inclined so that a position at a further left side (side stand 17 side) is lower. In this example, the actual inclination angle θ1 of the vehicle body 1A may be larger than the target angle range θ2 (the left side in FIG. 4). In this case, a control that contracts the front and rear suspension devices 3A, 13A is performed so that the inclination angle θ1 is within the target angle range θ2 (the right side in FIG. 4).

The vehicle body 1A of the embodiment is an assembly of vehicle configuration components that is integral with the vehicle body frame 5 and is integrally inclined with respect to the ground GL. The vehicle body 1A of the embodiment is an assembly of vehicle configuration components mainly except for the front and rear wheels 2, 12 and the front and rear suspension devices 3A, 13A.

Examples of the prescribed parking operation include, for example, an OFF operation of a main switch 36 (refer to FIG. 7) and a use operation of the side stand 17. The OFF operation of the main switch 36 is an ignition OFF operation and involves an engine stop. The use operation of the side stand 17 is an operation of swinging (rotating) the side stand 17 from a storage position (shown by a solid line in FIG. 1) in which the side stand 17 is swung rearward to a stand position (shown by a chain line in FIG. 1) in which the side stand 17 is lowered downward.

In order to detect an operation until the side stand 17 comes into contact with the ground and supports the vehicle body 1A, a load sensor may be provided on the side stand 17, a support portion of the side stand 17, or the like. That is, the operation until the load sensor detects a ground load may be the use operation of the side stand 17. In order to detect that the user gets off the vehicle, a seating sensor may be provided on the front and rear seats 16*a*, 16*b*. That is, the condition of the parking angle adjustment control may include the getting off the vehicle of the user. Details of the parking angle adjustment control will be described later.

<Control Device>

Figure 7:
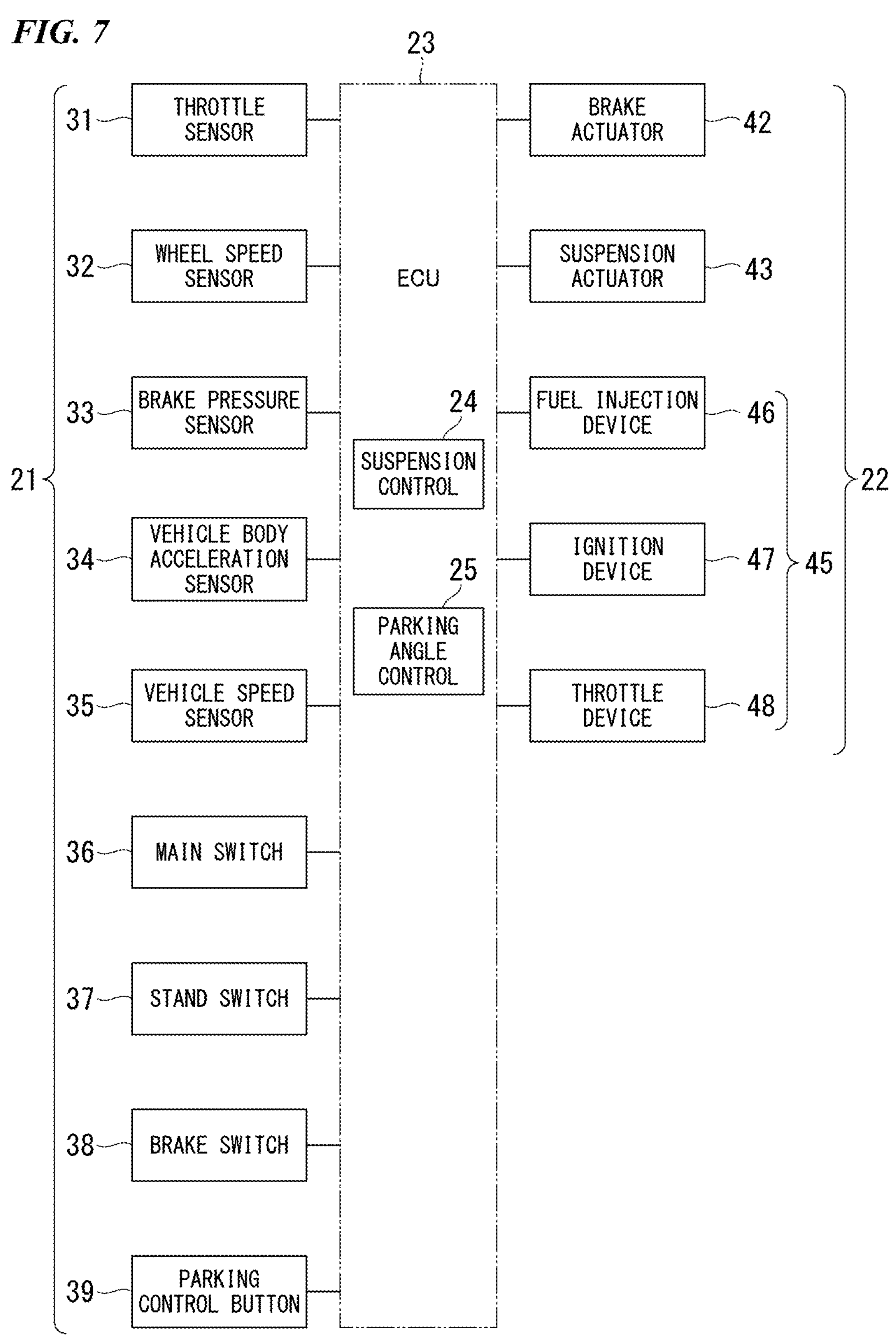
FIG. 7 is a block diagram of a control system of the motorcycle.

FIG. 7 is a block diagram schematically showing a control system of the motorcycle 1.

The motorcycle 1 includes a control portion 23 that controls and operates various devices 22 based on detection information acquired from various sensors and switches 21. The control portion 23 is constituted, for example, as an integral or a plurality of electronic control units (ECUs). At least part of the control portion 23 may be realized by cooperation of software and hardware.

The control portion 23 includes an engine control portion (a fuel injection control portion, an ignition control portion, and a throttle control portion) that controls an operation of an engine E. The motorcycle 1 constitutes a by-wire type engine control system. The engine control system electrically links an engine auxiliary machine such as a throttle body provided on the engine E and an accelerator operation element operated by the user.

The various sensors and switches 21 include a throttle sensor 31, a wheel speed sensor 32, a brake pressure sensor 33, a vehicle body acceleration sensor 34, a vehicle speed sensor 35, a main switch 36, a stand switch 37, a brake switch 38, and a parking control button 39.

The various sensors and switches 21 detect various operational inputs of the user and various states of the motorcycle 1. The various sensors and switches 21 output various detection information to the control portion 23.

The throttle sensor 31 detects the operation amount (acceleration request) of the accelerator operation element such as a throttle grip. The operation of the engine E is controlled based on the detected information.

The wheel speed sensor 32 includes front and rear wheel speed sensors 32*f*, 32*r* provided on the front and rear wheels 2, 12, respectively (refer to FIG. 8). The detection information of the wheel speed sensor 32 is used for a control of an ABS (Anti-lock Brake System), a TCS (Traction Control System), and the like.

The brake pressure sensor 33 detects an operation force (deceleration request) of the brake operation element. The operation of the brake actuator 42 is controlled based on this detection information.

The vehicle body acceleration sensor 34 is a five-axis or six-axis IMU (Inertial Measurement Unit). The vehicle body acceleration sensor 34 detects an angular velocity and an acceleration of the vehicle body 1A in three axes (a roll axis, a pitch axis, and a yaw axis) and further detects an angle of the vehicle body 1A in three axes from the result thereof. The vehicle body 1A of the embodiment includes not only the vehicle body frame 5 but also a configuration that performs behaviors such as rolling, pitching, and yawing integrally with the vehicle body frame 5. The detection information of the vehicle body acceleration sensor 34 is used for a control of the ABS, the TCS, a suspension control system, and the like.

The vehicle speed sensor 35 detects, for example, the number of rotations of an output shaft (counter shaft) of a transmission of the power unit P. The vehicle speed is calculated based on this detection information.

The main switch 36 switches between the ON and OFF of a vehicle electric power supply. The main switch 36 includes a key cylinder into which a physical key is inserted for performing a rotation operation. Alternatively, the main switch 36 includes a switch knob that enables or validates the rotation operation in a state where the ID of a smart key carried by the user is authenticated. When the main switch 36 is operated and rotated to an ON position, electric power is supplied to a control system, the start and the operation of the engine E becomes possible, and the operation of various electric components becomes possible. When the main switch 36 is operated and rotated to an OFF position, the electric power supply to the control system is cut off, and the engine E and various electrical components are stopped. The main switch 36 has an ACC position (accessory electric power supply position) between the ON position and an OFF position. In the ACC position, electric power supply relating to the start and the operation of the engine E is cut off, but electric power supply to the other various electric components is performed.

The stand switch 37 is arranged, for example, around a rotation shaft of the side stand 17. For example, the stand switch 37 is switched to an ON state when the side stand 17 is in the stand position, the stand switch 37 is switched to an OFF state when the side stand 17 is in the storage position, and thereby, it is possible to detect that the side stand 17 is in a use state.

The brake switch 38 is turned on when the user operates the brake operation element of the motorcycle 1, and the state becomes a brake operation state (braking state), and the brake switch 38 is turned off when the brake operation element returns to the state before the operation, and the brake operation (braking) is released. The brake switch 38 is switched to the ON state, and thereby, it is possible to detect that the motorcycle 1 is in the braking state.

The parking control button 39 is pressed when the execution condition of the parking angle adjustment control is satisfied, and thereby, the parking angle adjustment control is performed.

The various devices 22 include an engine control means 45, a brake actuator 42, and a suspension actuator 43.

The engine control means 45 includes a fuel injection device 46, an ignition device 47, a throttle device 48, and the like. That is, the engine control means 45 includes an engine auxiliary machine that drives the engine E.

The brake actuator 42 supplies hydraulic pressure to front and rear brakes in response to an operation on the brake operation element and operates the front and rear brakes. The brake actuator 42 also serves as a control unit of the ABS. The brake actuator 42 includes an ABS-ECU that electrically controls the operation of a hydraulic component relating to the ABS.

The suspension actuator 43 includes front and rear suspension actuators 43*f*, 43*r* that are integrally provided on the front and rear suspension devices 3A, 13A, respectively.

The front and rear suspension actuators 43*f*, 43*r* are driven and controlled by the control portion 23 in accordance with the detection information of the various sensors and switches 21 or the like. The front and rear suspension actuators 43*f*, 43*r* operate an electric motor which is a drive source of the front and rear suspension actuators **43*f*, 43*r* by the control by the control portion 23. The front and rear suspension actuator increases or decreases a resilient force or a damping force of the front and rear suspension devices 3A, 13**A.

Hereinafter, a suspension control system is described in detail.

The control portion 23 includes a suspension control portion 24 and a parking angle control portion 25.

The suspension control portion 24 detects the motion of the vehicle body 1A and the front and rear suspension devices 3A, 13A by the various sensors and switches 21 and automatically changes the damping force of the front and rear suspension devices 3A, 13A. When the motorcycle 1 starts traveling, the control portion 23 performs a damping force control of the front and rear suspension devices 3A, 13A at a predetermined cycle. The suspension control portion 24 operates, for example, an electromagnetic valve provided on a damper of each of the front and rear suspension devices 3A, 13A. Various values used for the suspension control are constantly measured during traveling of the motorcycle 1. Thereby, the damping force can be changed immediately in response to the situation of the motorcycle 1, and the maneuverability and the ride quality are improved.

The parking angle control portion 25 changes a stroke amount of each of the front and rear suspension devices 3A, 13A based on a vehicle body inclination angle θ1 detected by the vehicle body acceleration sensor 34. Thereby, the vehicle body inclination angle θ1 is adjustable to fall within a prescribed target angle range θ2 set in advance.

FIG. 2 to FIG. 4 are rear views in a state where the motorcycle 1 is stopped on a horizontal ground GL by using the side stand 17. A line HL in the drawing represents a horizontal line along the ground GL, and a line VL represents a vertical line that extends from a ground contact point of the front and rear wheels 2, 12. The inclination angle θ1 of the vehicle body 1A corresponds to an inclination angle of a vehicle body rightward-leftward middle line CL relative to the vertical line VL. The angle range θ2 corresponds to an angle range (target angle) determined in advance as a range of a stable parking angle.

With reference to FIG. 1 and FIG. 7, after parking (for example, a state where the motorcycle 1 is stopped, and a prescribed parking operation is performed) of the motorcycle 1 is detected, the control portion 23 performs the parking angle adjustment control under the following condition. That is, the control portion 23 performs the parking angle adjustment control, for example, while the main switch 36 is set to the ACC position (accessory electric power supply position), and the user is pressing the parking control button 39 supported by the handle **4*a*. That is, the parking angle adjustment control is performed in a state where the user is placing the user's hand on the handle 4*a*. The stability of the vehicle body 1A may be disturbed by the extending or the contracting of the front and rear suspension devices 3A, 13A in the state where the vehicle body 1A is supported by the side stand 17. Therefore, in the embodiment, the parking angle adjustment control is performed in the state where the user places the user's hand on the handle 4*a***.

Further, in the embodiment, the parking angle adjustment control is performed in a state (in a state where a brake is applied) where the user operates a brake lever supported by the handle **4*a*. In the embodiment, the execution condition of the parking angle adjustment control includes the ON state (brake operation state) of the brake switch 38**.

Alternatively, in the case where the motorcycle 1 includes a parking brake in accordance with the specification of the transmission or the like, the following mode may be adopted. That is, instead of the operation of the brake lever (or in combination with the operation of the brake lever), an operation state (the ON state of the brake switch 38) of the parking brake may be included in the execution condition of the parking angle adjustment control.

Hereinafter, a process performed by the control portion 23 in the parking angle adjustment control is described with reference to flowcharts of FIG. 5 and FIG. 6. This process is repeatedly performed at a predetermined cycle in the case where the motorcycle 1 stops, the user performs a prescribed parking operation, and then, the accessory electric power supply is turned on.

Figure 5:
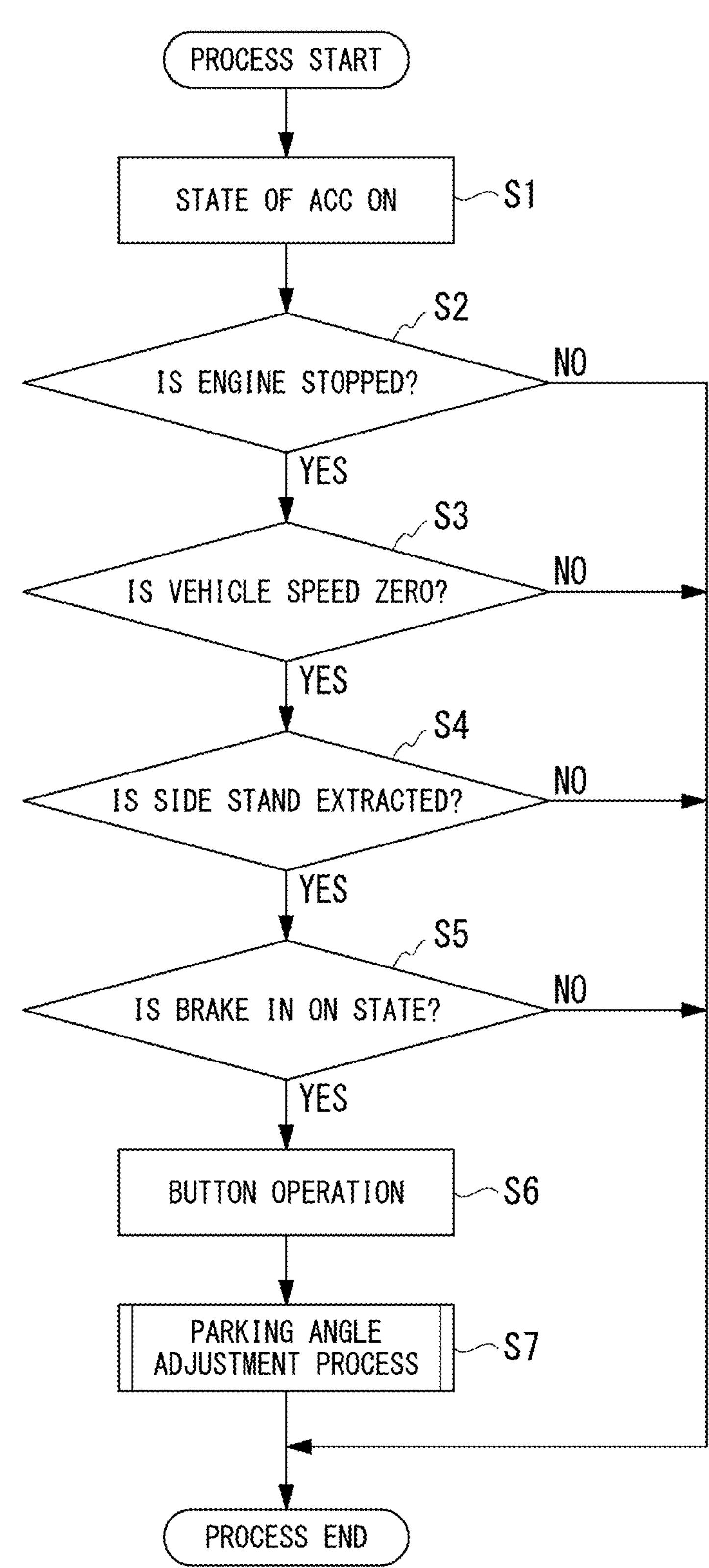
FIG. 5 is a flowchart showing a process performed by a control device in the parking angle adjustment control.

With reference to FIG. 5, first, when the accessory electric power supply is turned on after the parking of the motorcycle 1 is detected (Step S1), the parking angle control portion 25 confirms whether or not the condition for performing a parking angle control is satisfied. That is, in Step S2, it is confirmed that the engine E is stopped. In Step S3, it is confirmed that the vehicle speed is zero, and in Step S4, it is confirmed that the side stand 17 is extracted and is in a use state (the ON state of the stand switch 37). In Step S5, it is confirmed that the brake operation element is operated, and the state is in the braking state (the ON state of the brake switch 38).

When all of Step S2 to S5 are YES, the operation of the parking control button 39 is enabled or validated (Step S6), and the routine can proceed to Step S7. When any one of Step S2 to S5 is NO, the operation of the parking control button 39 is disabled or invalidated, and the process is once ended.

In Step S6, when the operation of the parking control button 39 is performed, the parking angle control portion 25 performs a parking angle adjustment process (Step S7). This process is performed while a press operation of the parking control button 39 is performed, and this process is stopped when the press operation is stopped.

Figure 6:
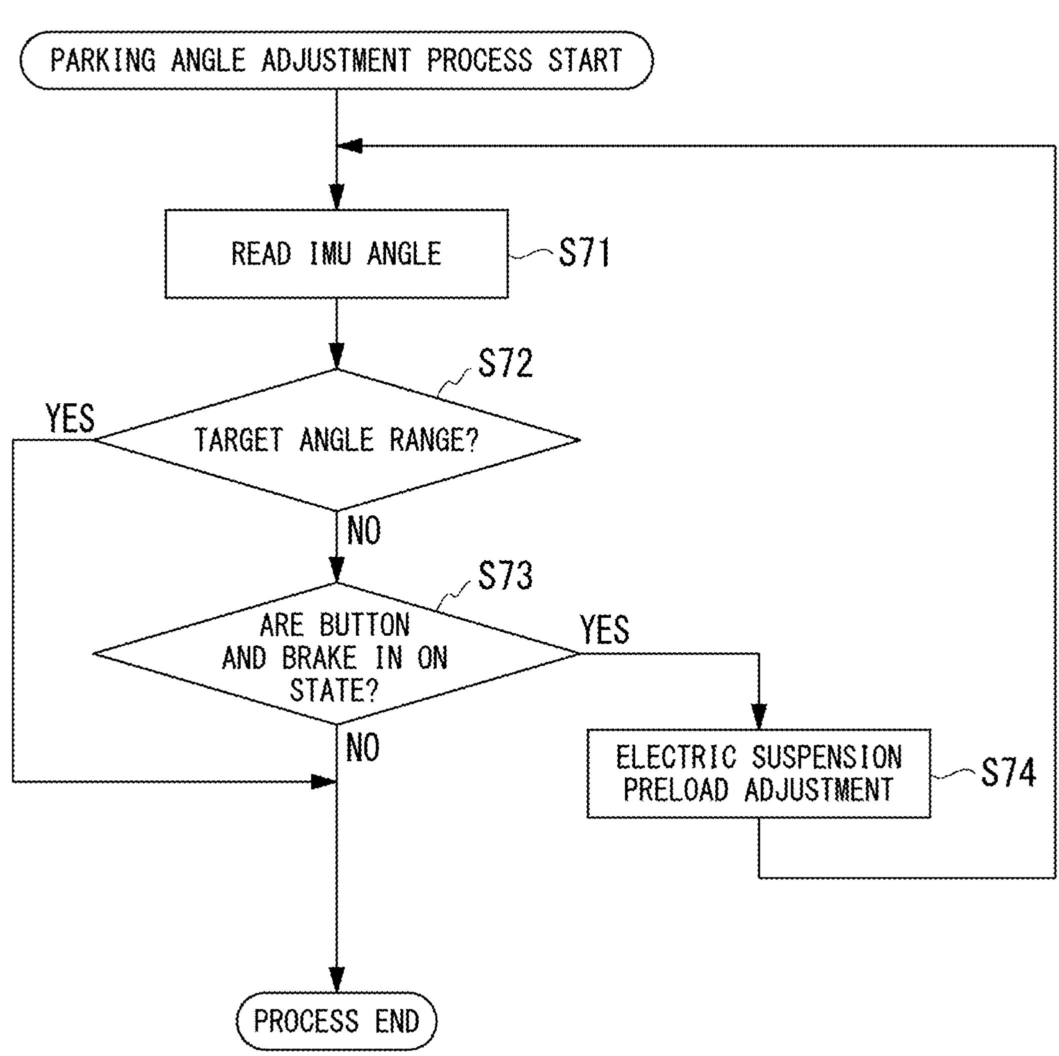
FIG. 6 is a flowchart showing the contents of a parking angle adjustment process of FIG. 5.

With reference to FIG. 6, in the parking angle adjustment process, first, the parking angle control portion 25 reads the vehicle body inclination angle θ1 detected by the IMU 34 (Step S71). Next, it is determined whether or not the vehicle body inclination angle θ1 is within the target angle range θ2 (Step S72). In the case of YES (within the target angle range θ2) in Step S72, the process is once ended. In the case of NO (not within the target angle range θ2) in Step S72, the following state is confirmed again in Step S73. That is, it is confirmed again that the parking control button 39 is in a press state (ON state), and the brake switch 38 is in the ON state. In the case of NO (at least one of the parking control button 39 and the brake switch 38 is not in the ON state) in Step S73, the process is once ended. In the case of YES (both the parking control button 39 and the brake switch 38 are in the ON state) in Step S73, the routine proceeds to Step S74. In Step S74, the suspension actuator of at least one of the front and rear suspension devices 3A, 13A is driven, and a preload adjustment and thus a vehicle height adjustment is performed. Thereby, the vehicle body inclination angle θ1 at the time of parking is adjusted to be within the target angle range θ2.

As described above, the motorcycle 1 in the embodiment described above includes: at least one front wheel 2 and at least one rear wheel 12 that are arranged at a front position and a rear position of the vehicle body 1A, respectively; the suspension devices 3A, 13A that are arranged between the vehicle body configuration component and the front wheel 2 and between the vehicle body configuration component and the rear wheel 12 and have the vehicle height adjustment function; the control portion 23 that controls driving of the suspension actuators 43*f*, 43*r* included in the suspension devices 3A, 13A, respectively; and the vehicle body acceleration sensor 34 that detects the inclination angle θ1 of the vehicle body 1A, wherein when parking of the motorcycle 1 is detected, the control portion 23 measures the inclination angle θ1 of the vehicle body 1A by the vehicle body acceleration sensor 34 and extends or contracts the suspension devices 3A, 13A by driving the suspension actuators 43*f*, 43*r* so as to cause the inclination angle θ1 to be closer to the prescribed target angle (to fall within the target angle range θ2).

According to this configuration, when the control portion 23 detects parking (for example, the motorcycle 1 stops, and a prescribed parking operation is performed) of the motorcycle 1, the control portion 23 measures an actual inclination angle θ1 of the vehicle body 1A by the vehicle body acceleration sensor 34. The control portion 23 extends or contracts the suspension devices 3A, 13A (changes the vehicle height) so as to cause the inclination angle θ1 to be closer to the target angle. Thereby, for example, even when the inclination angle θ1 of the vehicle body 1A increases or decreases due to the inclination of the ground GL, the loading of a heavy object, or the like, the inclination angle θ1 of the vehicle body 1A can be properly maintained by extending or contracting the suspension device 3A, 13A, and it is possible to reduce a turnover risk of the motorcycle 1 at the time of parking.

Further, in the motorcycle 1 described above, the control portion 23 decreases the preload so as to contract the suspension device 3A, 13A when the inclination angle θ1 is larger than the target angle (angle range θ2), and the control portion 23 increases the preload so as to extend the suspension device 3A, 13A when the inclination angle θ1 is smaller than the target angle (angle range θ2).

According to this configuration, in the suspension device 3A, 13A of a type that is contracted when receiving a load from the ground GL, the control portion 23 extends or contracts the suspension device 3A, 13A and properly maintains the inclination angle θ1 of the vehicle body 1A. Therefore, it is possible to reduce a turnover risk of the motorcycle 1 at the time of parking.

Further, the motorcycle 1 described above includes: the parking operation detection portion (the main switch 36, the stand switch 37, and the brake switch 38) which detects that a prescribed parking operation is performed by a user at the time of parking of the motorcycle 1, wherein the control portion 23 detects parking of the motorcycle 1 when the parking operation detection portion detects the parking operation.

According to this configuration, when the parking operation detection portion detects that the parking operation is performed by the user, the control portion 23 detects parking of the motorcycle 1. Thereby, it possible to further reliably detect parking of the motorcycle 1, and it is possible to prevent malfunction of the suspension device 3A, 13A.

Further, in the motorcycle 1 described above, the parking operation detected by the parking operation detection portion includes an operation of restricting the movement of the motorcycle 1.

According to this configuration, when the operation of restricting the movement of the motorcycle 1 is performed by the user, the control portion 23 extends or contracts the suspension device 3A, 13A. Thereby, it possible to enhance the stability when the inclination angle θ1 of the vehicle body 1A is changed. When the use of the parking brake is a condition for the parking detection, the operation itself necessary for the parking is one of the conditions for the parking angle adjustment control. Thereby, the parking operation necessary for the control can be easily understood, and it is possible to enhance convenience.

The present invention is not limited to the embodiment described above. For example, the vehicle height adjustment of the embodiment is described using a configuration in which the spring seat is electrically jacked up and jacked down but is not limited this configuration. For example, a configuration may be employed in which the vehicle height is changed by using a fluid pressure such as gas or oil. When the parking angle adjustment control is performed, for example, an information display portion included in a meter device may be operated. That is, when the motorcycle 1 is stopped, the user performs a prescribed parking operation, and then the accessory electric power supply is turned on, the following display may be performed on the information display portion. The information display portion may display the current inclination angle θ1 of the vehicle body 1A, may display whether the parking angle adjustment control is necessary, may display that the parking angle adjustment control is being performed while the parking control button 39 is pressed, or may display that the parking angle adjustment control is ended, and the vehicle body inclination angle θ1 is properly set.

As a method of performing the parking angle adjustment control, the parking angle adjustment control may be performable, for example, on the condition of the following determination after the OFF operation of the main switch 36 is performed. That is, when it is detected that the motorcycle 1 does not move or does not swing for a prescribed time determined in advance, it may be determined that the motorcycle 1 is in a parked state, and the parking angle adjustment control may be performable. According to this configuration, the parking operation other than the main switch 36 being turned off is not required, and a simple configuration can be achieved.

The present invention may be applied to saddle riding vehicles other than motorcycles. The saddle riding vehicles include all vehicles on which an occupant (user) rides by straddling the vehicle body and include not only motorcycles (including motorized bicycles and scooter-type vehicles) but also three-wheeled vehicles (including vehicles having two front wheels and one rear wheel in addition to vehicles having one front wheel and two rear wheels) or four-wheeled vehicles (a four-wheeled buggy or the like).

Application of the present invention is not limited to motorcycles, and the present invention can be applied to all vehicles that require the support of a user or the use of a side stand for standing by itself at the time of stopping. Further, even in the case of a vehicle that does not require the support of the user or the use of a stand for standing by itself at the time of stopping, the present invention can be applied for obtaining a prescribed stop posture (for example, a posture when the vehicle is parked on the horizontal ground GL in an empty vehicle state). That is, the present invention can be applied to vehicles (passenger cars, buses, trucks, or the like) other than saddle riding vehicles.

In the embodiment, the use of the side stand and the use of the brake in the motorcycle are the condition for performing the parking angle adjustment control. This condition may be similarly applied in the case of a tricycle of a vehicle body swing type. Even in a tricycle of a vehicle body swing type, there is a configuration in which a swing side vehicle body having a single wheel relatively swings against a non-swing side vehicle body that has a pair of right and left wheels and does not swing. In this configuration, the vehicle body is caused to stand by itself by interlocking the lock of the relative swing and the parking brake. In this case, the use of the stand may be excluded from the condition for performing the parking angle adjustment control. Hereinafter, a vehicle capable of standing by itself without requiring the use of the stand (and the support of the user) is referred to as a "self-supporting vehicle".

Figure 9:
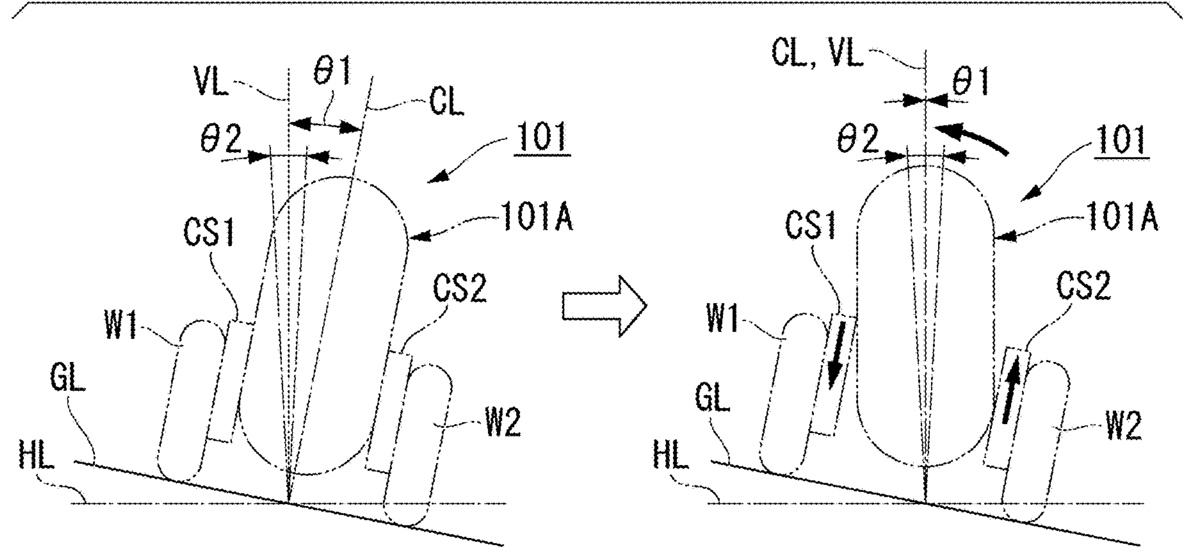
FIG. 9 is a rear view showing an example of the parking angle adjustment control of a vehicle including a pair of right and left wheels.

In the case of a self-supporting vehicle including at least one of a pair of right and left front wheels and a pair of right and left rear wheels, a configuration of a vehicle 101 shown in FIG. 9 is conceivable for performing the adjustment of the vehicle body inclination angle θ1. That is, it is conceivable that independent cushion units CS1, CS2 are provided on the pair of left and right wheels W1, W2, respectively. In this configuration, the cushion units CS1, CS2 provided on the pair of left and right wheels W1, W2, respectively, are individually extended and contracted. Thereby, the pair of left and right wheels W1, W2 can be moved upward and downward independently with respect to a vehicle body 101A, and the inclination angle θ1 in the rightward-leftward direction of the vehicle body 101A can be adjusted to the prescribed stop posture (for example, an upright posture). The control portion 23 drives suspension actuators arranged on the pair of left and right cushion units CS1, CS2, respectively, so that the inclination angle θ1 of the vehicle body 101A falls within the target angle range θ2. Thereby, one of the pair of left and right cushion units CS1, CS2 is extended, or another of the pair of the left and right cushion units CS1, CS2 is contracted. Alternatively, both of the extension and the contraction of the pair of left and right cushion units CS1, CS2 are performed.

Figure 10:
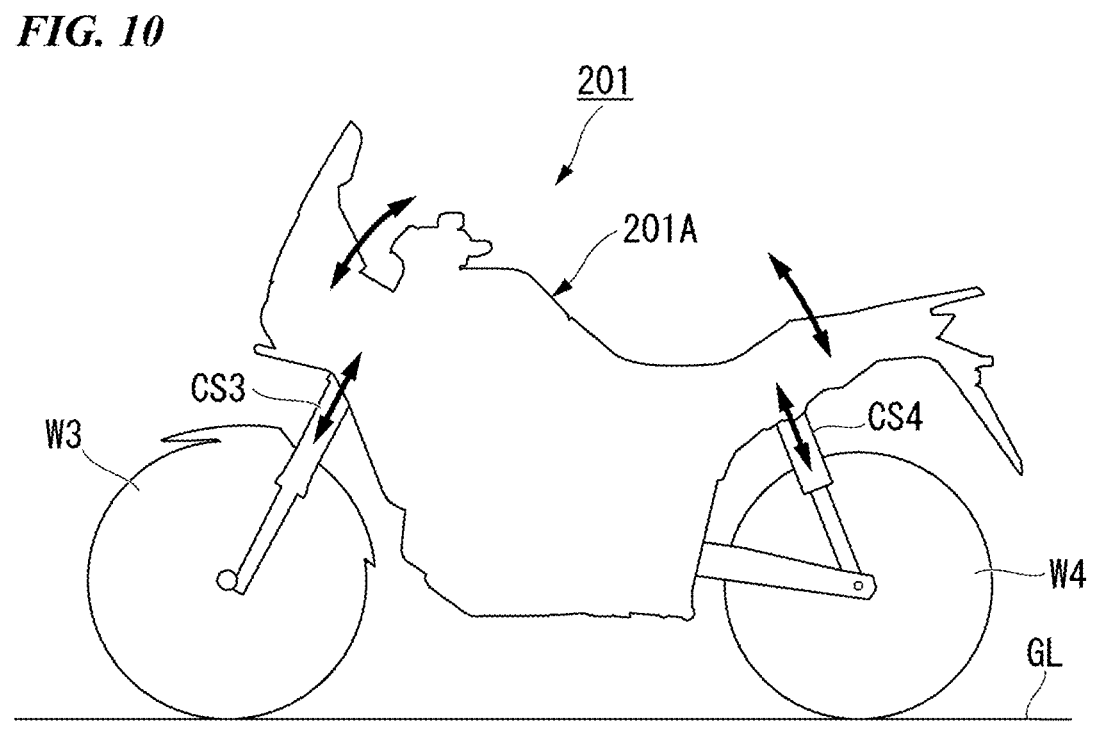

As in a vehicle 201 shown in FIG. 10, front and rear wheels W3, W4 include independent cushion units CS3, CS4, respectively, the front and rear cushion units CS3, CS4 are individually extended and contracted, and thereby, the following effects are obtained. That is, the inclination angle θ1 of the vehicle body 201A in the forward-rearward direction can be adjusted to the prescribed parking posture (for example, a posture when the vehicle is parked on the horizontal ground GL in an empty vehicle state).

The configurations in the embodiment described above are merely examples of the present invention, and various changes can be made without departing from the scope of the present invention such as replacing the components of the embodiment with well-known components.

DESCRIPTION OF THE REFERENCE SYMBOLS

1 Motorcycle (vehicle)
1A Vehicle body
2 Front wheel
3 Front fork
3A Front suspension device
12 Rear wheel
13 Rear cushion unit
13A Rear suspension device
17 Side stand
23 Control portion (Control device)
24 Suspension control portion
25 Parking angle control portion
34 Vehicle body acceleration sensor (vehicle body angle detection device)
36 Main switch (parking operation detection portion)
37 Stand switch (parking operation detection portion)
38 Brake switch (parking operation detection portion)
39 Parking control button
43 Suspension actuator
43*f*, 43*r* Front and rear suspension actuators
θ1 Vehicle body inclination angle
θ2 Target angle range
W1, W2 Pair of right and left wheels
CS1, CS2 Pair of right and left cushion units

What is claim is:

1. A vehicle comprising:
at least one front wheel and at least one rear wheel that are arranged at a front position and a rear position of a vehicle body, respectively;
a suspension device that is arranged between a vehicle body configuration component and at least one of the front wheel and the rear wheel and has a vehicle height adjustment function;
a control device that controls driving of an actuator which extends and contracts the suspension device;
a vehicle body angle detection device that detects an inclination angle of the vehicle body; and
a side stand capable of supporting the vehicle body in a standing state in which the vehicle body is inclined to one of right and left sides,
wherein the vehicle comprises: a parking operation detection portion which detects that a use operation of the side stand is performed at a time of parking of the vehicle, and
the control device detects parking of the vehicle when the parking operation detection portion detects the use operation, and when the parking of the vehicle is detected, the control device measures the inclination angle of the vehicle body by the vehicle body angle detection device and extends or contracts the suspension device by driving the actuator so as to cause the inclination angle to be closer to a prescribed target angle.

2. The vehicle according to claim 1,
wherein the control device contracts the suspension device when the inclination angle is larger than the target angle, and the control device extends the suspension device when the inclination angle is smaller than the target angle.

3. The vehicle according to claim 1,
wherein the parking operation detected by the parking operation detection portion includes an operation of restricting a movement of the vehicle.

4. The vehicle according to claim 1,
wherein the control device detects the parking of the vehicle when detecting that the vehicle does not move for a prescribed time after a main switch of the vehicle is turned off.

5. The vehicle according to claim 1, comprising:
a parking control button supported by a handle,
wherein a control that causes the inclination angle to be closer to the prescribed target angle is performed when the parking control button is being pressed.

6. The vehicle according to claim 1, comprising:
a seating sensor on a seat,
wherein a control that causes the inclination angle to be closer to the prescribed target angle is performed when detecting that a user gets off the vehicle.

* * * * *